US007612782B2

(12) United States Patent
Kurumisawa et al.

(10) Patent No.: US 7,612,782 B2
(45) Date of Patent: Nov. 3, 2009

(54) COLOR CONVERSION MATRIX CREATING DEVICE, COLOR CONVERSION MATRIX CREATING PROGRAM, AND IMAGE DISPLAY APPARATUS

(75) Inventors: Takashi Kurumisawa, Shiojiri (JP); Masanori Ishida, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 11/251,902

(22) Filed: Oct. 18, 2005

(65) Prior Publication Data

US 2006/0103862 A1 May 18, 2006

(30) Foreign Application Priority Data

Nov. 16, 2004 (JP) ............................. 2004-331459

(51) Int. Cl.
*G09G 5/02* (2006.01)
(52) U.S. Cl. .................................................... 345/604
(58) Field of Classification Search ........................ None
See application file for complete search history.

(56) References Cited

U.S. PATENT DOCUMENTS

| | | | | | |
|---|---|---|---|---|---|
| 5,489,921 | A | * | 2/1996 | Dorff et al. | 345/604 |
| 5,579,031 | A | * | 11/1996 | Liang | 345/604 |
| 6,023,527 | A | * | 2/2000 | Narahara | 382/167 |
| 6,058,207 | A | * | 5/2000 | Tuijn et al. | 382/162 |
| 6,058,208 | A | * | 5/2000 | Ikeda et al. | 382/167 |
| 6,414,756 | B1 | * | 7/2002 | Tsukada | 358/1.9 |
| 6,560,358 | B1 | * | 5/2003 | Tsukada | 382/167 |
| 6,724,935 | B1 | * | 4/2004 | Sawada et al. | 382/167 |
| 7,265,778 | B2 | * | 9/2007 | Braun | 348/184 |
| 7,314,283 | B2 | * | 1/2008 | Tsukada | 353/121 |
| 2002/0047848 | A1 | * | 4/2002 | Odagiri et al. | 345/581 |
| 2003/0016862 | A1 | * | 1/2003 | Ohga | 382/162 |
| 2003/0025688 | A1 | * | 2/2003 | Cottone et al. | 345/207 |
| 2003/0030754 | A1 | * | 2/2003 | Tsukada | 348/649 |
| 2003/0053088 | A1 | * | 3/2003 | Kanai et al. | 358/1.9 |
| 2003/0184779 | A1 | * | 10/2003 | Ohga | 358/1.9 |
| 2004/0183813 | A1 | * | 9/2004 | Edge | 345/600 |
| 2004/0257599 | A1 | * | 12/2004 | Chi et al. | 358/1.9 |
| 2005/0018226 | A1 | * | 1/2005 | Chiba | 358/1.9 |

FOREIGN PATENT DOCUMENTS

| | | |
|---|---|---|
| JP | 06-339016 | 12/1994 |
| JP | 2003-319411 | 11/2003 |

* cited by examiner

*Primary Examiner*—Xiao M Wu
*Assistant Examiner*—Maurice McDowell, Jr.
(74) *Attorney, Agent, or Firm*—Lowe Hauptman Ham & Berner LLP (57) ABSTRACT

A color conversion matrix creating device determines a first matrix for color conversion between a color space of a display device and a reference color space, first color values on the reference color space corresponding to predetermined RGB colors on the color space of the display device, a second matrix for color conversion between a prescribed target color space and the reference color space, second color values on the prescribed target color space corresponding to the predetermined RGB colors, third color values on a new target color space based on the first and the second color values, a third matrix for color conversion between the new target color space and the reference color space based on the third color values, and a color conversion matrix for color conversion between the color space of the display device and the new target color space based on the first and the third matrices.

15 Claims, 5 Drawing Sheets

COLOR CONVERSION MATRIX CREATING DEVICE, COLOR CONVERSION MATRIX CREATING PROGRAM, AND IMAGE DISPLAY APPARATUS

BACKGROUND

1. Technical Field

The present invention relates to a method of setting a target color space in a color management or color matching technology.

2. Related Art

Various display devices including a cathode ray tube (CRT), a liquid crystal panel, and the like are known as devices for displaying image data. When image data is displayed on these display devices, a known image processing technology is used in which a desired target color space is set and color conversion on input image data from a color space of a corresponding display device to a target color space is performed so as to display image data. This technology is referred to as color management or color matching, and an example thereof has been disclosed in JP-A-2003-319411.

In the above-described color management technology, when a color space of a display device is significantly different from a target color space to which color matching is to be performed, color clipping may occur, and a gray-scale representation of an original color may not be performed. Accordingly, when the color space of the display device as the target is changed, color conversion parameters need to be adjusted accordingly, such that it may be difficult to realize automatic color matching by the color management technology.

SUMMARY

An advantage of some aspects of the invention is that it provides a color conversion matrix creating device, which can automatically calculate color conversion parameters, while minimizing color clipping, even when a color space of a display device is significantly changed, and a color conversion matrix creating program.

According to a first aspect of the invention, a color conversion matrix creating device includes a first conversion matrix creating unit that determines a first conversion matrix for color conversion between a color space of a display device and a reference color space, a first calculating unit that calculates color values on the reference color space corresponding to predetermined RGB colors on the color space of the display device by use of the first conversion matrix as first color values, a second conversion matrix creating unit that determines a second conversion matrix for color conversion between a prescribed target color space and the reference color space, a second calculating unit that calculates color values on the prescribed target color space corresponding to the predetermined RGB colors by use of the second conversion matrix as second color values, an arithmetic unit that determines color values on a new target color space corresponding to the predetermined RGB colors by use of the first color values and the second color values, a third conversion matrix creating unit that determines a third conversion matrix for color conversion between the new target color space and the reference color space on the basis of the color values on the new target color space, and a color conversion matrix creating unit that determines a color conversion matrix for color conversion between the color space of the display device and the new target color space on the basis of the first conversion matrix and the third conversion matrix.

In accordance with the first aspect of the invention, the color conversion matrix creating device is disposed, for example, in a manufacturing line or test line of a display device and determines the color conversion matrix used for color matching when the manufactured display device displays images. Specifically, in the color conversion matrix creating device, first, the first conversion matrix for converting the color space of the display device into the color space of the predetermined reference color space, such as an XYZ calorimetric system or the like, is determined, and the color values on the reference color space corresponding to the predetermined RGB colors of the display device by use of the first conversion matrix are calculated as the first color values. Further, the second conversion matrix for converting the prescribed target color space into the reference color space is determined, and the color values on the prescribed target color space corresponding to the predetermined RGB colors are calculated by use of the second conversion matrix as the second color values. Then, the color values of the new target color space are determined by use of the first color values and the second color values, and the third conversion matrix for color conversion between the new target color space and the reference color space is determined on the basis of the color values of the new target color space. Next, the color conversion matrix for color conversion between the color space of the display device and the new target color space is determined on the basis of the first conversion matrix and the third conversion matrix. The color conversion matrix obtained in such a manner serves as the color conversion matrix for automatically generating the new target color space between the color space of the display device and the prescribed target color space and performing color matching to the new target color space. Therefore, even when a deviation in color characteristic (color space) of the display device is significant, proper color matching between the color space of the display device and the prescribed target color space can be performed.

In the color conversion matrix creating device according to the first aspect of the invention, it is preferable that the arithmetic unit determine the color values on the new target color space by performing a weighted arithmetic operation on the first color values and the second color values according to a prescribed matching coefficient. According to this configuration, by properly setting the matching coefficient, the color conversion matrix, which can perform proper color matching, can be automatically obtained, while minimizing color clipping.

The color conversion matrix creating device according to the first aspect of the invention may further include a calorimetric measuring unit that measures colors displayed on the display device. In this case, it is preferable that the first conversion matrix creating unit determine the first conversion matrix on the basis of the color values on the reference color space obtained by the colorimetric measuring unit. The color characteristics of the individual display devices are measured by the calorimetric measuring unit, and the color conversion matrix is generated on the basis of the measurement result. Therefore, the color conversion matrix suitable for each display device can be properly set.

The color conversion matrix creating device according to the first aspect of the invention may further include a color adaptation correction matrix creating unit that determines a color adaptation correction matrix on the basis of a white point in the color space of the display device and a white point in the prescribed target color space. In this case, it is preferable that the first conversion matrix creating unit determines the first conversion matrix by use of the color adaptation correction matrix. The determined color adaptation correction matrix is used to create the color conversion matrix, such that a proper color conversion matrix can be obtained in consideration of the color adaptation. In this case, it is preferable that the color adaptation correction matrix creating unit create the color adaptation correction matrix in which a degree of color adaptation is defined on the basis of a prescribed color adaptation coefficient. Therefore, the degree of color adaptation to be corrected can be optionally set.

According to the second aspect of the invention, an apparatus for testing a display device includes the above-described color conversion matrix creating device, a display control unit that causes a predetermined calorimetric pattern to be displayed on the display device, a calorimetric measuring device that measures the calorimetric pattern displayed on the display device, and a setting unit that sets the color conversion matrix in the display device. Here, the first conversion matrix creating unit determines the first conversion matrix on the basis of the color values on the reference color space obtained by the calorimetric measuring device.

In accordance with the second aspect of the invention, the predetermined calorimetric pattern is displayed on the display device and is measured by the colorimetric measuring unit, such that the color space of the display device is decided. Further, the first conversion matrix is determined on the basis of the color values on the reference color space obtained by the calorimetric measuring unit, and the color conversion matrix is determined by use of the first conversion matrix and the like. Then, the determined color conversion matrix is set in the display device. Therefore, the color conversion matrix can be automatically set with respect to a plurality of display devices. Further, in the display device in which the color conversion matrix is set by the apparatus for testing a display device, proper color matching can be performed on the basis of the corresponding color conversion matrix.

According to a third aspect of the invention, a color conversion matrix creating program, which causes a computer to function as a first conversion matrix creating unit that determines a first conversion matrix for color conversion between a color space of a display device and a reference color space, a first calculating unit that calculates color values on the reference color space corresponding to predetermined RGB colors on the color space of the display device by use of the first conversion matrix as first color values, a second conversion matrix creating unit that determines a second conversion matrix for color conversion between a prescribed target color space and the reference color space, a second calculating unit that calculates color values on the prescribed target color space corresponding to the predetermined RGB colors by use of the second conversion matrix as second color values, an arithmetic unit that determines color values on a new target color space corresponding to the predetermined RGB colors using the first color values and the second color values, a third conversion matrix creating unit that determines a third conversion matrix for color conversion between the new target color space and the reference color space on the basis of the color values on the new target color space, and a color conversion matrix creating unit that determines a color conversion matrix for color conversion between the color space of the display device and the new target color space on the basis of the first conversion matrix and the third conversion matrix. This color conversion matrix creating program may be executed on a personal computer (PC) or other computer devices, such that the above-described color conversion matrix creating device can be implemented.

Further, according to a fourth aspect of the invention, an image display apparatus includes a storage unit that stores the color conversion matrix created by the above-described color conversion matrix creating device, a color conversion processing unit that performs color conversion on an externally input image signal by use of the color conversion matrix and displays a color-converted image signal on a display unit, and a display device. Therefore, the image display apparatus can perform a proper color conversion processing, that is, color matching, on the basis of the color conversion matrix created by the color conversion matrix creating device in the display device and can display the images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings.

Schematic Description

First, a color management (color matching) method according to the invention will be schematically described. In a general color matching method, a desired target color space is set, and a conversion parameter (conversion matrix) for conversion of a color space of a display device to a desired color space is generated. Then, color conversion (which is also referred to as 'color correction' or 'color matching') is performed on image data inputted to the display device on the basis of the conversion parameter, and image data after color conversion is displayed on the display device. By doing so, color display can be performed in the desired color space, without depending on the color space of the display device, that is, characteristics of the display device itself.

Generally, the conversion parameter for converting the color space of the display device into the target color space is determined in advance through arithmetic operations or the like for each display device, and is set to the corresponding display device. Specifically, in the final step of a manufacturing process of the display device, such as a liquid crystal panel or the like, the color space of the display device is determined by measurement, and the conversion parameter for converting that color space to the target color space is calculated. Then, the obtained conversion parameter is set in the corresponding display device. This setting can be performed, for example, by a method of storing the setting in a non-volatile memory in the display device or the like. As such, the conversion parameter for conversion to the target color space is set in advance in the display device, such that an input image can be color-converted to the target color space in the display device and can be displayed thereon.

General color matching is performed as described above, and thus, even when the same target color space is set to the display devices of the same specification, if a deviation in color space occurs among a plurality of display devices, the conversion parameters to be set with respect to the individual display devices are made different from one another. Accordingly, when the display devices having the same specification are mass-produced, if the deviation in color space occurs among the display devices to be actually produced, different conversion parameters need to be created and set for the individual display devices. That is, the conversion parameter needs to be adjusted according to the deviation in color space for each display device. Accordingly, when the deviation in color space for each display device is significant, it is difficult to automatically create and set the conversion parameter for the display device.

Figure 1A:
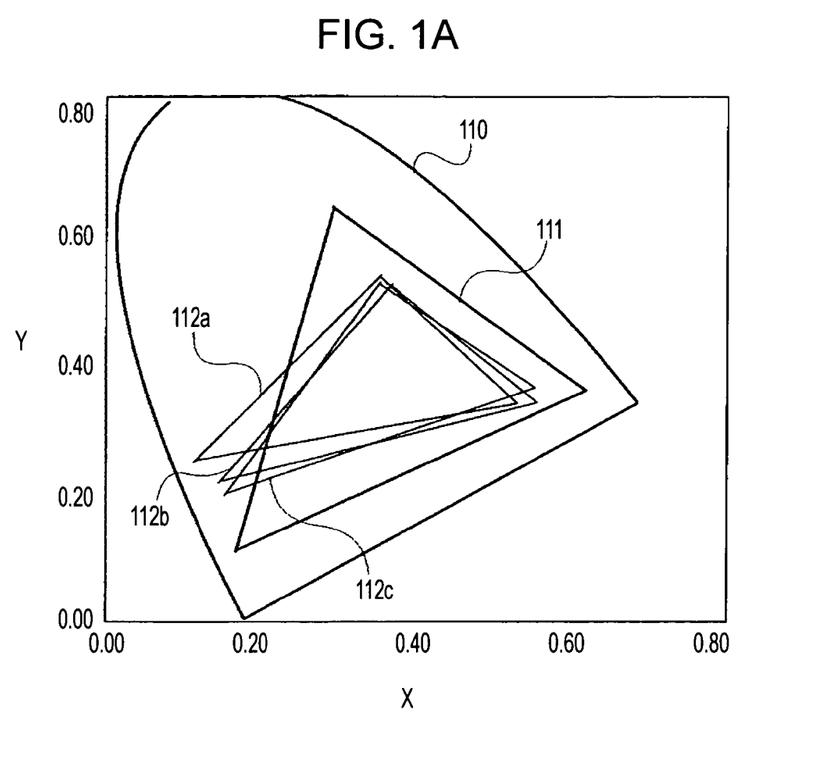
FIG. 1A is a graph showing an example of a deviation in color characteristic of a display device.

Actually, the deviation in characteristics among the display devices having the same specification is large. FIG. 1A shows an example of the color spaces of a plurality of LCD modules having the same specification. FIG. 1A is an xy chromaticity diagram and shows a color space 111 of sRGB and three color spaces 112a to 112c of the LCD modules in a chromaticity coordinate 110. As shown in FIG. 1A, the color spaces are different from one another, even in the LCD modules having the same specification. Moreover, the LCD module has a liquid crystal panel and an illumination device having a light-emitting diode (LED) or the like. The three color spaces 112a to 112c shown in FIG. 1A represents color spaces of three LCD modules in which three different illumination devices are assembled into the liquid crystal panels having the same specification. Accordingly, the differences among the above-described color spaces are caused by the differences among the illumination devices.

Figure 1B:
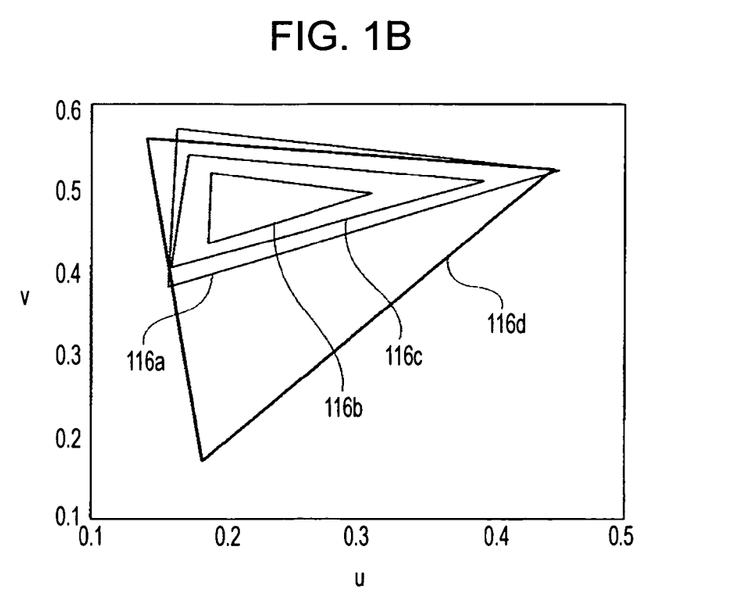
FIG. 1B is a graph showing an example of a deviation in color characteristic of a display device.

On the other hand, the color spaces also are different from one another according to the kinds of liquid crystal panels. FIG. 1B is a uv chromaticity diagram showing color spaces 116a to 116d of four kinds of liquid crystal panels different from one another. The differences are caused by different kinds of liquid crystal used, different light-emission principles, or the like.

As such, even in the display devices having the same specification, when the respective color spaces are significantly different from one another, the conversion parameters for color matching need to be adjusted and set for the individual display devices in a manufacturing line, which makes it difficult to automatically create and set the conversion parameters.

Accordingly, in the invention, a new target color space is automatically created on the basis of the color space of each display device and a prescribed target color space. Then, the conversion parameter for color conversion from the color space of the display device to the new target color space is automatically generated and set in the display device. By doing so, even when the differences among the color spaces of a plurality of display devices are significant, the color conversion parameter for color matching can be automatically set.

Figure 2:
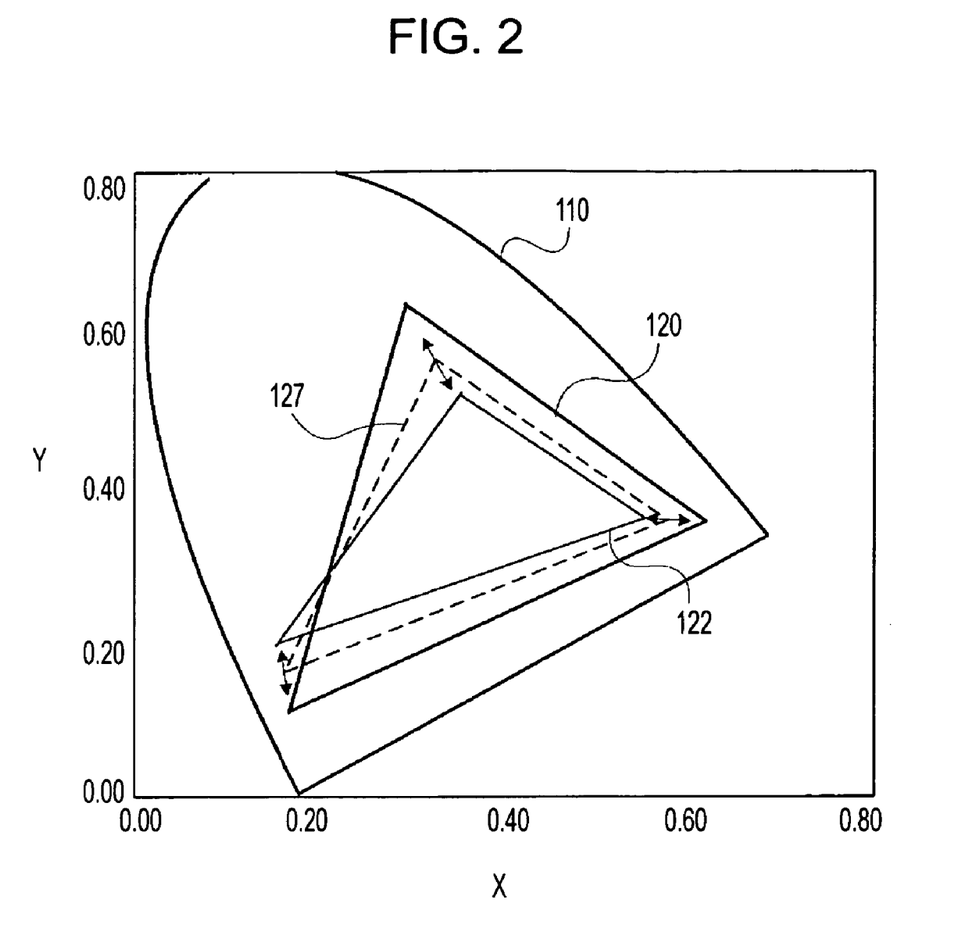
FIG. 2 is a graph schematically showing the setting of a color space by a color matching technology according to the invention.

The method of the invention described above will be conceptually described with reference to FIG. 2. Like FIG. 1A, FIG. 2 is an xy chromaticity diagram and shows a predetermined target color space 120 and a color space 122 of a display device. As shown in FIG. 2, the color space 122 of the display device does not correspond to the target color space 120. Further, as described above, the color space 122 of the display device is significantly different among the individual display devices. Accordingly, in the invention, a new target color space 127 (indicated by a dotted line) is automatically set on the basis of the color space 122 of the display device and the target color space 120. Though the detailed description thereof will be described below, a matching coefficient is set in advance, and the color space 122 of the display device and the target color space 120 are subjected to weighted addition at a ratio according to the matching coefficient, thereby automatically generating the new target color space 127. Then, the color conversion parameter (that is, color conversion matrix) for color conversion of the color space of the display device to the new target color space is automatically calculated and set in the display device. As such, by automatically generating the new target color space by the arithmetic operation, even when the differences in color space among the individual display devices are significant, the color conversion parameter for color matching can be automatically set.

Apparatus for Testing Display Device

Figure 3:
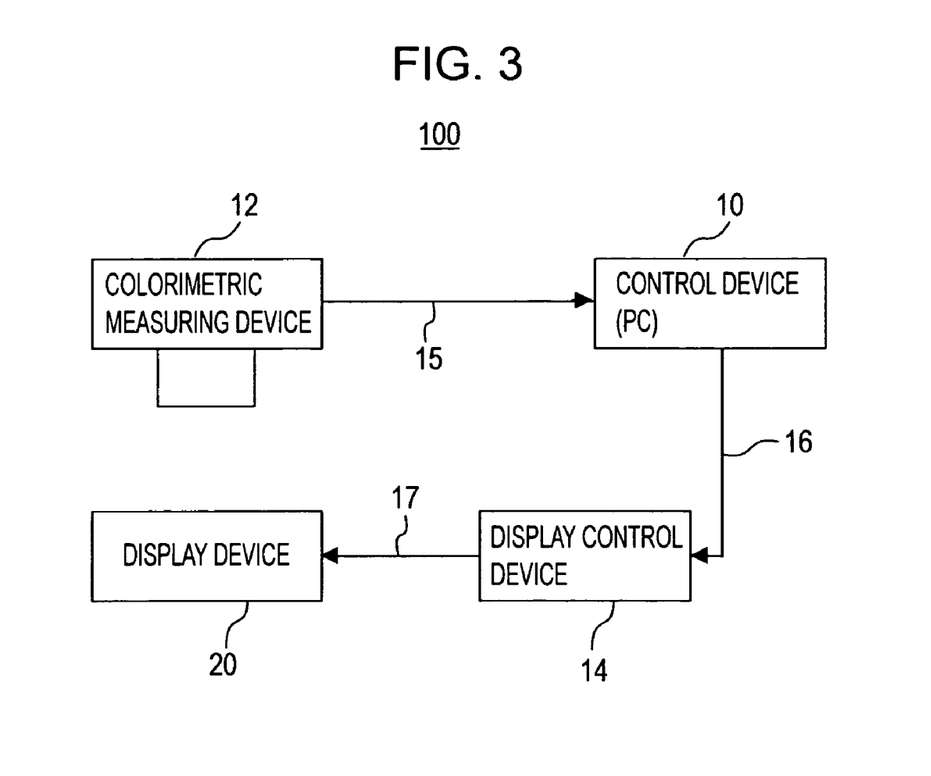
FIG. 3 is a diagram showing a schematic configuration of an apparatus for testing a display device.

Next, an apparatus for testing a display device to which the method of creating the color conversion matrix of the invention is applied will be described. FIG. 3 shows the schematic configuration of the apparatus for testing a display device. As shown in FIG. 3, the apparatus 100 for testing a display device is an apparatus which automatically generates and sets a color conversion matrix for color matching of a display device 20. The apparatus 100 for testing a display device includes a control device 10, a calorimetric measuring device 12, and a display control device 14. The control device 10 may be constituted by a computer device, such as a personal computer (PC) or the like, which executes a predetermined program.

The display control device 14 generates a predetermined calorimetric image pattern to be used for calorimetric measurement on the basis of an instruction from the control device 10 and supplies the calorimetric image pattern to the display device 20 as a signal 17. Moreover, the calorimetric image pattern includes, for example, maximum values, gray-scale levels, of respective RGB colors, or the like. The display device 20 displays the calorimetric image pattern supplied from the display control device 14, and the calorimetric measuring device 12 captures the calorimetric image pattern displayed on the display device 20, and supplies its result to the control device 10. Moreover, in the present embodiment, an XYZ calorimetric system is used as a reference color space, and the calorimetric measuring device outputs the calorimetric measurement result as tri-stimulus values (XYZ values) 15.

The control device 10 calculates the color space of the display device 20 on the basis of the XYZ values obtained by the calorimetric measuring device 12. Further, the control device 10 automatically generates the new target color space by use of a prescribed target color space and a prescribed matching coefficient. In addition, the control device 10 automatically creates a color conversion matrix for conversion of the color space of the display device to the new target color space, and sets the color conversion matrix in the display device via the display control device 14. By doing so, the color conversion matrix for conversion of the color space of the display device to the new target color space is automatically set in the display device 20. Moreover, the detailed descriptions of a series of steps will be described below.

Figure 4:
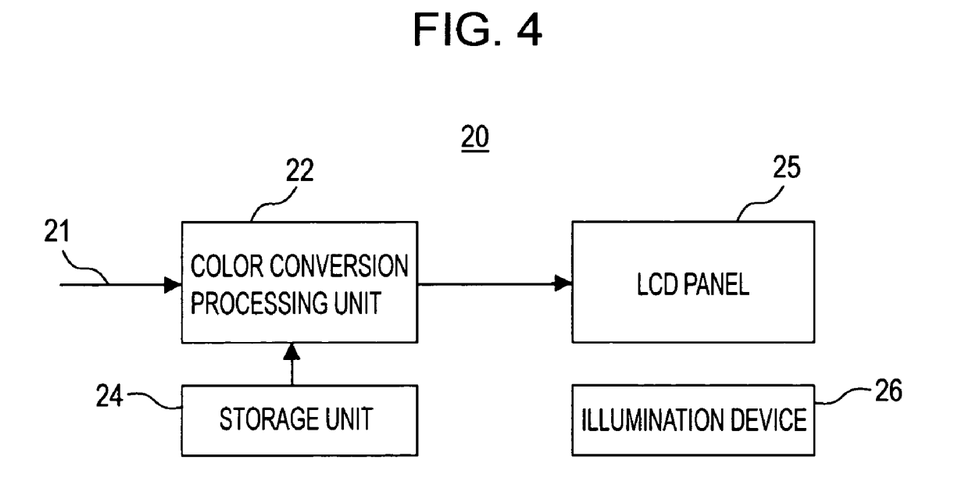
FIG. 4 is a diagram schematically showing an internal configuration of a display device.

FIG. 4 schematically shows the internal configuration of the display device. In the present embodiment, the display device 20 is a liquid crystal display device, which includes a color conversion processing unit 22, a storage unit 24, an LCD panel 25, and an illumination device 26. The display device 20 displays an image corresponding to an externally input image signal 21 on the LCD panel 25. The illumination device 26, for example, may be a backlight unit having a light source, such as an LED or the like, and illuminates the LCD panel 25 at the time of transmissive display.

The storage unit 24 can be constituted by a non-volatile memory or the like, and the color conversion matrix automatically generated by the above-described control device 10 is stored in the storage unit 24. The color conversion processing unit 22 is constituted by an image processing circuit or the like, which performs a predetermined image processing, for example, including gamma conversion or the like on the input image signal 21 and supplies the processed signal to the LCD panel 25. Further, in the present embodiment, the color conversion processing unit 22 performs a color conversion processing (color matching) on the input image signal 21 by use of the color conversion matrix stored in the storage unit 24, and supplies the image signal after color conversion to the LCD panel 25. By doing so, an image after color conversion according to the color conversion matrix, that is, an image suitable for the above-described new target color space, is displayed on the LCD panel 25.

Color Matching

As described above, color matching of the invention has a feature in that the new target color space is automatically generated, and the color conversion matrix for conversion to the new target color space is automatically generated on the basis of the color space of the display device obtained by the calorimetric measurement and the prescribed target color space. First, for the sake of better understanding of the color matching technology according to the invention, a general color matching technology will be briefly described.

General Color Matching

Color matching indicates a color conversion processing which is performed to convert the color space of the display device into the prescribed target color space. In general, the color matching is performed by the following equation 1.

Equation 1 (1)

$$\begin{bmatrix} R_{LCD} \\ G_{LCD} \\ B_{LCD} \end{bmatrix} = M \begin{bmatrix} R_{tgt} \\ G_{tgt} \\ B_{tgt} \end{bmatrix}$$

In the equation 1, $R_{LCD}$ to $B_{LCD}$ are color values on the color space of the display device, $R_{tgt}$ to $B_{tgt}$ are color values on the target color space, and M is the color conversion matrix. Moreover, in the equation 1, R, G, and B are color values after linearization (gamma correction) and normalization. Therefore, in order to perform color matching, the numeric values of the color conversion matrix M need to be provided to the display device.

When an XYZ calorimetric system is set as the reference color space, as represented by the following equation, a composite matrix of a conversion matrix $M_{tgt}$ for conversion of the target color space to the reference color space and a conversion matrix $M_{LCD}$ for conversion of the color space of the display device (hereinafter, referred to as 'device color space') to the reference color space becomes the color conversion matrix M required for color matching.

Equation 2 (2)

$$\begin{bmatrix} X \\ Y \\ Z \end{bmatrix} = M_{tgt} \begin{bmatrix} R_{tgt} \\ G_{tgt} \\ B_{tgt} \end{bmatrix}, \begin{bmatrix} X \\ Y \\ Z \end{bmatrix} = M_{LCD} \begin{bmatrix} R_{LCD} \\ G_{LCD} \\ B_{LCD} \end{bmatrix}$$

$$\text{Hence } \begin{bmatrix} R_{LCD} \\ G_{LCD} \\ B_{LCD} \end{bmatrix} = M_{LCD}^{-1} M_{tgt} \begin{bmatrix} R_{tgt} \\ G_{tgt} \\ B_{tgt} \end{bmatrix}$$

That is, the color conversion matrix M satisfies the condition $M = M^{-1}_{LCD} M_{tgt}$.

Even in the general color matching method, when $M_{LCD}$ is universal, by substituting the value of $M_{tgt}$ with the conversion matrix for conversion to the new target color space which reduces saturation (clipping) of colors, the composite matrix M can be determined. However, when the deviation in color space is significant even in the display devices of the same specification or when the display devices are different, precision of color matching is degraded and the degree of color clipping is increased.

Moreover, when the device color space is the same as the target color space, the color conversion matrix M becomes a unit matrix. At this time, color clipping does not occur in the display device having the color space which is about half the target color space, but precision of color matching is extremely degraded.

Color Matching of the Invention

Next, color matching according to an embodiment of the invention will be described. In the invention, a color conversion matrix M fixed to the display device is not set, but colorimetric measurement is performed on a manufacturing line of the display device and a color conversion matrix M automatically generated for each display device is set in the display device. This is represented by the following equation.

Equation 3 (3)

$$\begin{bmatrix} R_{LCD} \\ G_{LCD} \\ B_{LCD} \end{bmatrix} = M \begin{bmatrix} R_{tgt} \\ G_{tgt} \\ B_{tgt} \end{bmatrix} = M_{LCD}^{-1} M_{tgt} \begin{bmatrix} R_{tgt} \\ G_{tgt} \\ B_{tgt} \end{bmatrix}$$

That is, the conversion matrices $M_{LCD}$ and $M_{tgt}$ are acquired on the manufacturing line, and the color conversion matrix M is determined by applying the matching coefficient thereto.

Figure 5:
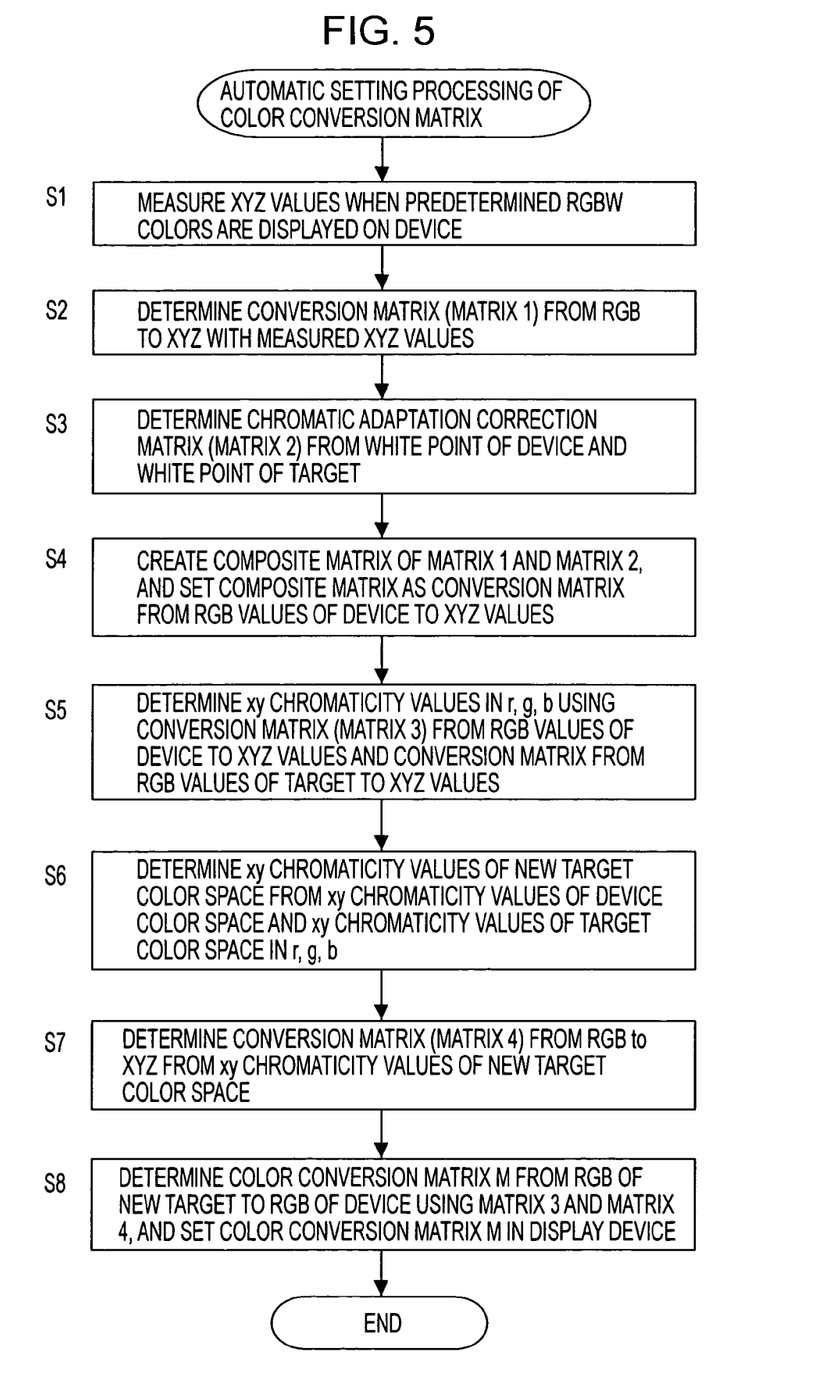
FIG. 5 is a flowchart showing an automatic setting process of a color conversion matrix by a color matching method according to the invention.

FIG. 5 shows a flowchart of an automatic setting process of the color conversion matrix M according to the color matching method of the invention. This automatic setting process is executed by the apparatus 100 for testing a display device shown in FIG. 3. In particular, the step S1 is executed by the calorimetric measuring device 12 and the control device 10, the steps S2 to S7 are executed by the control device 10, and the step S8 is performed by the control device 10 and the display control device 14. Moreover, the steps executed by the control device 10 may be implemented by causing a computer constituting the control device 10 to execute an automatic setting program prepared in advance.

First, the control device 10 controls the display control device 14 so as to cause predetermined R, G, B, and W (white) colors to be displayed on the display device 20, and the colors are measured by the colorimetric measuring device 12 (Step S1). This step can be performed on a plurality of calorimetric image patterns prepared in advance, if necessary. With the colorimetric measurement, color values on the reference color space corresponding to the respective colors, that is, the XYZ values in the XYZ calorimetric system in the present embodiment, are obtained.

Next, the control device 10 determines a conversion matrix $M_{org}$ (matrix 1) for conversion of the RGB color values of the device color space to the XYZ calorimetric system serving as the reference color space on the basis of the XYZ values obtained by the calorimetric measurement (Step S2).

Next, the control device 10 determines a white point of the color space of the display device and a white point of the target color space, and determines a color adaptation correction matrix (matrix 2) therefrom (Step S3). The term 'color adaptation' means a property that sensitivity of human eyes with respect to circumferential colors is degraded, and the term 'color adaptation correction matrix' means a matrix which corrects degradation of sensitivity due to the color adaptation. Here, the color adaptation correction matrix is determined and is applied to color conversion, such that the difference between the white point of the target color space and the white point of the color space of the display device is adjusted. The color adaptation correction matrix can be determined, for example, by means of a well-known method, such as XYZ scaling, von Kries conversion, Bradford conversion, or the like.

In the present embodiment, a color adaptation selection coefficient, which designates a method of determining the color adaptation correction matrix, is defined. The color adaptation selection coefficient is defined, for example, as described below.

Color Adaptation Selection Coefficient=0; the color adaptation correction matrix is set as the unit matrix.

Color Adaptation Selection Coefficient=1; the color adaptation correction matrix is determined by XYZ scaling.

Color Adaptation Selection Coefficient=2; the color adaptation correction matrix is determined by the von Kries conversion.

Color Adaptation Selection Coefficient=3; the color adaptation correction matrix is determined by the Bradford conversion.

Therefore, the color adaptation correction matrix is determined through the method represented by the prescribed color adaptation selection coefficient.

Further, in the present embodiment, the color adaptation coefficient defining a degree of color adaptation is defined. When the XYZ values of the white point of the target color space are (X0, Y0, Z0) and the XYZ values of the white point of the color space of the display device are (X1, Y1, Z1), the color adaptation correction matrix determined by general XYZ scaling is represented as follows.

Equation 4 (4)

$$\begin{bmatrix} X0/X1 & 0 & 0 \\ 0 & Y0/Y1 & 0 \\ 0 & 0 & Z0/Z1 \end{bmatrix}$$

In this case, when the color adaptation selection coefficient is 'k' (where $0 \leq k \leq 1$), the color adaptation correction matrix, in consideration of the degree of color adaptation of the white point of the target color space is represented by the following equation 5. However, when k=1, color adaptation of 100% is considered, and, when k=0, color adaptation is not considered.

Equation 5 (5)

$$\begin{bmatrix} (X0*k+X1*(1-k))/X1 & 0 & 0 \\ 0 & (Y0*k+Y1*(1-k))/Y1 & 0 \\ 0 & 0 & (Z0*k+Z1*(1-k))/Z1 \end{bmatrix}$$

This color adaptation correction matrix (matrix 2) is referred to as $M_{col}$.

Next, the control device 10 creates the composite matrix of the conversion matrix $M_{org}$ (matrix 1) for conversion to the XYZ colorimetric system serving as the reference color space and the color adaptation correction matrix $M_{col}$ (matrix 2). This composite matrix is referred to as the conversion matrix $M_{LCD}$ (matrix 3) for conversion of the RGB color values on the color space of the display device to the XYZ values on the reference color space (Step S4). That is, the condition $M_{LCD}=M_{col}*M_{org}$ is satisfied.

Next, by use of the conversion matrix $M_{LCD}$ (matrix 3) for conversion of the RGB color values on the color space of the display device to the XYZ values on the reference color space, an xy chromaticity on the reference color space corresponding to predetermined RGB color values on the color space of the display device is determined. The predetermined RGB color values may be set, for example, to full-color RGB color values (maximum gray-scale values of respective RGB colors) in the display device. Hereinafter, the predetermined RGB color values are referred to as r, g, and b. In this case, when r among the predetermined RGB color values is converted into the XYZ values on the reference color space by use of the matrix 3, the following equation is obtained.

Equation 6 (6)

$$\begin{bmatrix} XR \\ YR \\ ZR \end{bmatrix} = M_{LCD} \begin{bmatrix} 1 \\ 0 \\ 0 \end{bmatrix}$$

In this case, when the xy chromaticity of r is (R1x, R1y), through a conversion equation from the XYZ values to the xy chromaticity, the following equations are obtained.

$R1x=XR/(XR+YR+ZR)$ $R1y=YR/(XR+YR+ZR)$

Similarly, the xy chromaticity value (G1x, G1y) of g of the predetermined RGB color values and the xy chromaticity value (B1x, B1y) of b of the predetermined RGB color values are determined. The predetermined RGB color values are set as full-color RGB color values of the display device, so that the xy chromaticity values of r, g, and b obtained in such a manner represent apexes of a triangle of the color space 122 of the display device shown in FIG. 2. By doing so, the xy chromaticity values when the color space of the display device is converted into the reference color space (XYZ calorimetric system) are obtained.

Further, similarly, by use of the conversion matrix for conversion of the target color space to the XYZ values on the reference color space, the XYZ values on the reference color space corresponding to the predetermined RGB color values r, g, and b are determined, and the xy chromaticity values of the predetermined RGB color values r, g, and b are determined on the basis of the determined XYZ values. The xy chromaticity value of r is referred to as (R0x, R0y), the xy chromaticity value of g is referred to as (G0x, G0y), and the xy chromaticity value of b is referred to as (B0x, B0y). The xy chromaticity values of the RGB color values r, g, and b obtained in such a manner represent the respective apexes of a triangle of the target color space 120 shown in FIG. 2. By doing so, the xy chromaticity values when the device color space is converted into the reference color space (XYZ calorimetric system) are obtained.

Next, the control device 10 determines the xy chromaticity values of the new target space by use of the xy chromaticity values (R1x, R1y), (G1x, G1y), and (B1x, B1y) when the color space of the display device is converted into the reference color space (XYZ calorimetric system) and the xy chromaticity values (R0x, R0y), (G0x, G0y), and (B0x, B0y) when the target color space is converted into the reference color space (XYZ calorimetric system) (Step S6). Specifically, a matching coefficient 'a' means a ratio between a distance from the chromaticity value of the target color space and a distance from the chromaticity value of the color space of the display device. That is, as represented by the following equations, the xy chromaticity values of the new target color space are obtained by performing a weight addition of the xy chromaticity values of the color space of the display device and the xy chromaticity values of the target color space by use of the matching coefficient a.

The xy chromaticity of r in the new target color space (Rnewx, Rnewy):

$Rnewx = R0x*a + R1x*(1-a)$ $Rnewy = R0y*a + R1y*(1-a)$

The xy chromaticity of g in the new target color space (Gnewx, Gnewy):

$Gnewx = G0x*a + G1x*(1-a)$ $Gnewy = G0y*a + G1y*(1-a)$

The xy chromaticity of b in the new target color space (Bnewx, Bnewy):

$Bnewx = B0x*a + B1x*(1-a)$ $Bnewy = B0y*a + B1y*(1-a)$

Accordingly, the coordinates of three points of the new target color space 127 in FIG. 2 are obtained. Moreover, as the matching coefficient a is higher, the target color space is considered, and, as the matching coefficient a is smaller, the color space of the display device is considered. That is, as the matching coefficient a is closer to 1, precision of color matching is made favorable, but, color clipping is increased. Otherwise, as the matching coefficient a is closer to 0, precision of color matching is made worse, but, color clipping is decreased. Accordingly, by properly setting the value of the matching coefficient a in advance, color matching can be automatically performed while ensuring precision of color matching and minimizing color clipping.

By doing so, if the xy chromaticity values in the new target color space are obtained, the control device 10 determines a conversion matrix $M_{new}$ (matrix 4) for conversion of the RGB color values of the new target color space to the XYZ values of the reference color space (Step S7). Then, by use of the conversion matrix $M_{LCD}$ (matrix 3) for conversion of the RGB color values on the color space of the display device to the XYZ values on the reference color space and the conversion matrix $M_{new}$ (matrix 4) for conversion of the RGB color values of the new target color space to the XYZ values of the reference color space, the color conversion matrix M for conversion of the new target color space to the color space of the display device is determined as follows.

$M = M^{-1}_{LCD} M_{new}$

Accordingly, the color matching equation according to the present embodiment is represented as follows.

Equation 7 (7)

$$\begin{bmatrix} R_{LCD} \\ G_{LCD} \\ B_{LCD} \end{bmatrix} = M^{-1}_{LCD} M_{new} \begin{bmatrix} R_{tgt} \\ G_{tgt} \\ B_{tgt} \end{bmatrix}$$

When the color conversion matrix M is obtained, the control device 10 controls the display control device 14 and the like so as to set the value of the color conversion matrix M in the storage unit 24 of the display device (Step S8). Then, the automatic setting process of the color conversion matrix according to the invention ends.

As described above, in the invention, even when the color characteristics (color space) of the target and the color characteristics (color space) of the display device (TFT, C-STN, OLED, or the like) are variously changed, automatic adaptation process can be performed, while matching precision with respect to the same target color space can be ensured to some extents. Therefore, even when different kinds of display devices are transferred on the same manufacturing line and test line, automatic color matching can be properly performed on the display devices.

Further, even when a backlight (an illumination device), such as a white LED or the like, the color characteristics of which are significantly changed, is applied to the same display devices, automatic color matching can be flexibly performed by properly setting the matching coefficient a. Therefore, color clipping can be prevented, while absorbing color deviation to some extent. Further, color matching can be performed while maintaining a gray-scale property.

First Modification

Figure 6:
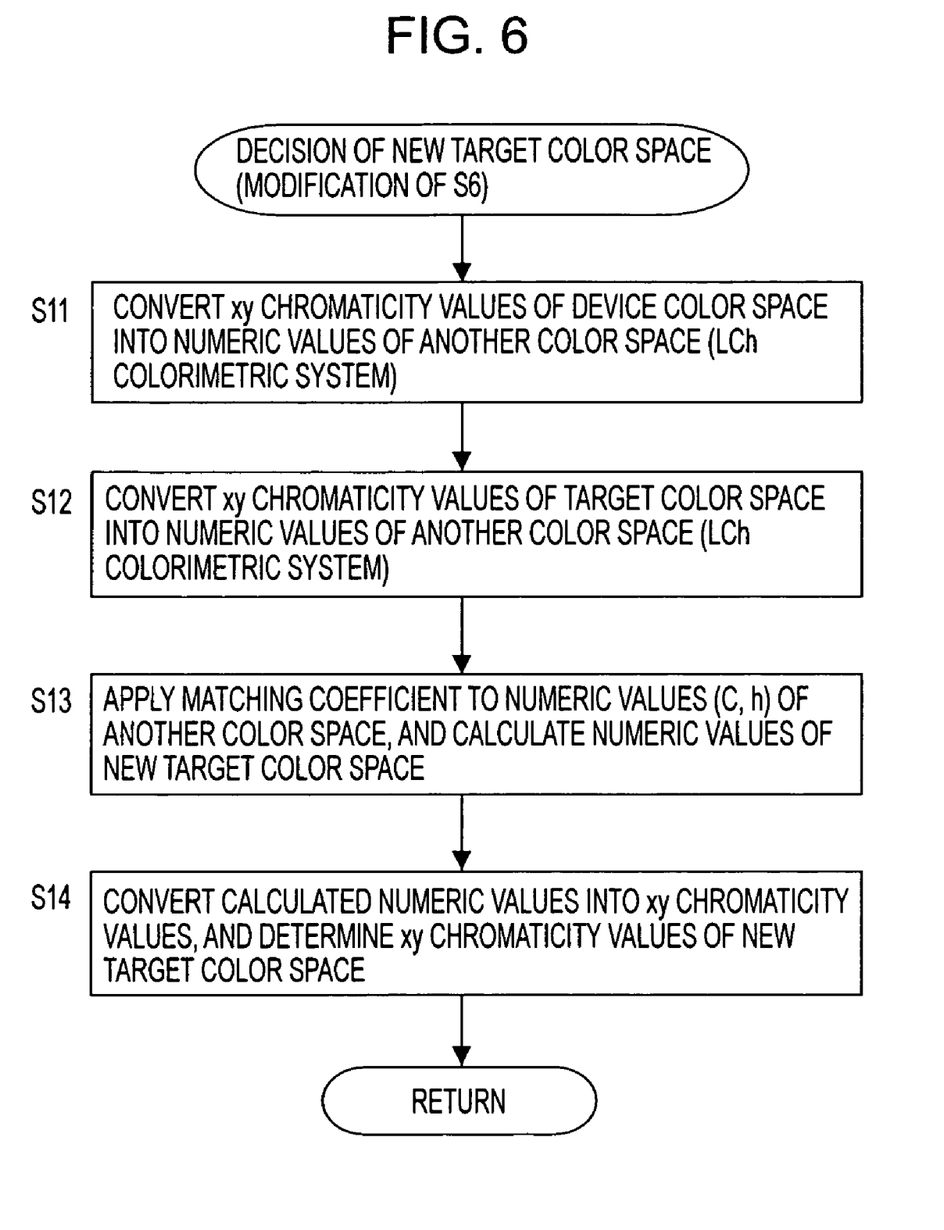
FIG. 6 is a flowchart showing a modification of a method of deciding a new target color space.

In the automatic setting process of the color conversion matrix shown in FIG. 5, at the step S6, the new target color space is decided by defining the matching coefficient a on the basis of the xy chromaticity values in the XYZ calorimetric system. Alternatively, the xy chromaticity values of the predetermined RGB color values r, g, and b may be substituted with color values of another calorimetric system according to circumstances, and a new target color space on the another calorimetric system may be decided. FIG. 6 shows a process in a case in which the new target color space is set by defining a matching coefficient on an LCh calorimetric system. Moreover, FIG. 6 shows the step to be executed as a substitute for the step S6 in FIG. 5.

Referring to FIG. 6, first, the xy chromaticity values of the device color space obtained at the step S5 are converted into the color values in the LCh colorimetric system (Step S11). Similarly, the xy chromaticity values of the target color space are converted into the color values in the LCh calorimetric system (Step S12). Then, the matching coefficient is applied to the C and h values in the LCh colorimetric system, thereby calculating the color values of the new target color space. For example, when the color value converted from the color value r in the color space of the display device to the LCh calorimetric system is (R0c, R0h) and the color value converted from the color value r in the target color space to the LCh calorimetric system is (R1c, R1h), the color values (Rnewc, Rnewh) of r in the new target color space can be determined by the following equations.

$$Rnewc = R0c*a + R1c*(1-a)$$

$$Rnewh = R0h*a + R1h*(1-a)$$

Similarly, for the predetermined RGB color values g and b, the color values in the new target color values can be determined.

Further, the color values calculated for the predetermined RBG color values r, g, and b may be converted into the xy chromaticity values in the XYZ calorimetric system (Step S14), and the steps S7 and S8 in FIG. 5 can be performed by use of the xy chromaticity values.

Moreover, in the LCh colorimetric system, the L value represents luminance, the C value represents hue, and the h value represents color saturation. Therefore, the matching coefficient can be applied to the C and h values on the LCh calorimetric system in order to decide the new target color space, such that color matching can be performed while properly controlling the hue and the color saturation.

Second Modification

In the above-described embodiment, the control device 10 determines the color conversion matrix M for color conversion between the new target color space and the color space of the display device as the composite matrix of the conversion matrices $M_{LCD}$ and $M_{new}$ and sets the composite matrix in the display device. Alternatively, the final color conversion matrix M may be determined by performing weighting to both matrices $M_{LCD}$ and $M_{new}$, not by the composite matrix of the conversion matrices $M_{LCD}$ and $M_{new}$. For example, a composite ratio α may be introduced, and the composite matrix of the matrices $M_{LCD}$ and $M_{new}$ may be determined on the basis of the composite ratio and set as the color conversion matrix M. Therefore, a degree of point adaptation of the white point, and a degree of matching of a color region can be changed. Moreover, this method is particularly effective in fine-adjusting the degree of color matching when the target color space is changed.

Third Modification

In the above-described embodiment, the control device 10 calculates the color conversion matrix M for color conversion between the new target color space and the color space of the display device, for example, as shown in the step S8 of FIG. 5, and sets the calculated color conversion matrix M in the display device. Alternatively, functions of the steps S2 to S8 in FIG. 5 may be provided in the display device 20, and the display device may be configured to automatically generate and set the color conversion matrix M. In this case, the control device 10 supplies, to the display device 20, measured color data obtained at the step S1 and the predetermined matching coefficient (color adaptation selection coefficient, color adaptation coefficient, or the like, if necessary). A processing unit provided in the display device may calculate and set the color conversion matrix M by performing the same process as that of the control device 10. This method causes a process load in the display device to be increases, but, has a feature in that the color conversion matrix can be flexibly calculated for the target color space selected (or changed) by the display device.

What is claimed is:

1. A color conversion matrix creating device, comprising:
a first conversion matrix creating unit for determining a first conversion matrix ($M_{LCD}$) for color conversion between a color space of a display device and a reference color space;
a first calculating unit for, based on the first conversion matrix ($M_{LCD}$), calculating first color values on the reference color space which correspond to predetermined colors on the color space of the display device;
a second conversion matrix creating unit for determining a second conversion matrix ($M_{tgt}$) for color conversion between a prescribed target color space and the reference color space;
a second calculating unit for, based on the second conversion matrix ($M_{tgt}$), calculating second color values on the prescribed target color space which correspond to the predetermined colors;
an arithmetic unit for, based on the first color values and the second color values, determining third color values on a new target color space which correspond to the predetermined colors;
a third conversion matrix creating unit for, based on the third color values, determining a third conversion matrix ($M_{new}$) for color conversion between the new target color space and the reference color space;
a color conversion matrix creating unit for, based on the first conversion matrix ($M_{LCD}$) and the third conversion matrix ($M_{new}$), determining a color conversion matrix (M) for color conversion between the color space of the display device and the new target color space; and
a color adaptation correction matrix creating unit for determining a color adaptation correction matrix ($M_{col}$) on the basis of a white point in the color space of the display device and a white point in the prescribed target color space;
wherein the first conversion matrix creating unit is configured to create the first conversion matrix ($M_{LCD}$) by using the color adaptation correction matrix ($M_{col}$).

2. The color conversion matrix creating device according to claim 1,
wherein the arithmetic unit is configured to determine the third color values on the new target color space by performing a weighted arithmetic operation on the first color values and the second color values according to a prescribed matching coefficient.

3. The color conversion matrix creating device according to claim 1, further comprising:
a colorimetric measuring unit for measuring colors displayed on the display device,
wherein the first conversion matrix creating unit is configured to determine the first conversion matrix ($M_{LCD}$) on the basis of the color values on the reference color space obtained by the colorimetric measuring unit.

4. The color conversion matrix creating device according to claim 1,
wherein the color adaptation correction matrix creating unit is configured to create the color adaptation correction matrix ($M_{col}$) in which a degree of color adaptation is defined on the basis of a prescribed color adaptation coefficient.

5. An apparatus for testing a display device, said apparatus comprising:
the color conversion matrix creating device according to claim 1;
a display control unit for causing a predetermined colorimetric pattern to be displayed on the display device;
a colorimetric measuring device for measuring the colorimetric pattern displayed on the display device; and
a setting unit for setting the color conversion matrix (M) in the display device,
wherein the first conversion matrix creating unit is configured to determine the first conversion matrix ($M_{LCD}$) on the basis of the color values on the reference color space obtained by the colorimetric measuring device.

6. An image display apparatus, comprising:
a display device;
a storage unit that stores the color conversion matrix (M) created by the color conversion matrix creating device according to claim 1; and
a color conversion processing unit for performing color conversion on an externally input image by using the color conversion matrix (M) and displays a color-converted image on the display device.

7. The color conversion matrix creating device according to claim 1, wherein
the predetermined colors on the color space of the display device are RGB colors,
the reference color space is the XYZ color space, and
the first, second and third values are xy chromaticity values.

8. The color conversion matrix creating device according to claim 1, wherein
the predetermined colors on the color space of the display device are RGB colors,
the reference color space is the XYZ color space,
the first, second and third values are color values in the LCh colorimetric system.

9. The color conversion matrix creating device according to claim 1, wherein the color conversion matrix creating unit is configured to determine the color conversion matrix (M) as a composite matrix of the first conversion matrix ($M_{LCD}$) and the third conversion matrix ($M_{tgt}$).

10. The color conversion matrix creating device according to claim 1, wherein
the color conversion matrix creating unit is configured to determine the color conversion matrix (M) by performing weighting to both the first conversion matrix ($M_{LCD}$) and the third conversion matrix ($M_{tgt}$).

11. A computer-readable medium containing thereon a color conversion matrix creating program, which, when executed by a computer, causes the computer to:
determine a first conversion matrix ($M_{LCD}$) for color conversion between a color space of a display device and a reference color space;
based on the first conversion matrix ($M_{LCD}$), calculate first color values on the reference color space which correspond to predetermined colors on the color space of the display device;
determine a second conversion matrix ($M_{tgt}$) for color conversion between a prescribed target color space and the reference color space;
based on the second conversion matrix ($M_{tgt}$), calculate second color values on the prescribed target color space which correspond to the predetermined colors;
based on the first color values and the second color values, determine third color values on a new target color space which correspond to the predetermined colors;
based on the third color values, determine a third conversion matrix ($M_{new}$) for color conversion between the new target color space and the reference color space;
based on the first conversion matrix ($M_{LCD}$) and the third conversion matrix ($M_{new}$), determine a color conversion matrix (M) for color conversion between the color space of the display device and the new target color space; and
determine a color adaptation correction matrix ($M_{col}$) on the basis of a white point in the color space of the display device and a white point in the prescribed target color space;
wherein the first conversion matrix ($M_{LCD}$) is determined by using the color adaptation correction matrix ($M_{col}$).

12. A color conversion matrix creating device, comprising:
a first conversion matrix creating unit for determining a first conversion matrix ($M_{LCD}$) for color conversion between a color space of a display device and a reference color space;
a first calculating unit for, based on the first conversion matrix ($M_{LCD}$), calculating first color values on the reference color space which correspond to predetermined colors on the color space of the display device;
a second conversion matrix creating unit for determining a second conversion matrix ($M_{tgt}$) for color conversion between a prescribed target color space and the reference color space;
a second calculating unit for, based on the second conversion matrix ($M_{tgt}$), calculating second color values on the prescribed target color space which correspond to the predetermined colors;
an arithmetic unit for, based on the first color values and the second color values, determining third color values on a new target color space which correspond to the predetermined colors;
a third conversion matrix creating unit for, based on the third color values, determining a third conversion matrix ($M_{new}$) for color conversion between the new target color space and the reference color space; and
a color conversion matrix creating unit for, based on the first conversion matrix ($M_{LCD}$) and the third conversion matrix ($M_{new}$), determining a color conversion matrix (M) for color conversion between the color space of the display device and the new target color space;
wherein
the predetermined colors on the color space of the display device are RGB colors;
the reference color space is the XYZ color space;
the first, second and third values are xy chromaticity values; and
the arithmetic unit is configured to determine the third values by using the following equations:

$$Rnewx = R0x*a + R1x*(1-a)$$

$$Rnewy = R0y*a + R1y*(1-a)$$

$$Gnewx = G0x*a + G1x*(1-a)$$

$$Gnewy = G0y*a + G1y*(1-a)$$

$$Bnewx = B0x*a + B1x*(1-a)$$

$$Bnewy = B0y*a + B1y*(1-a)$$

where
Rnewx, Rnewy are the third color values for color R,
Gnewx, Gnewy are the third color values for color G,
Bnewx, Bnewy are the third color values for color B,
R0x, R0y are the second color values for color R, G0x, G0y are the second color values for color G,
B0x, B0y are the second color values for color B,
R1x, R1y are the first color values for color R,
G1x, G1y are the first color values for color G,
B1x, B1y are the first color values for color B, and
a is a matching coefficient.

13. A color conversion matrix creating device, comprising:
a first conversion matrix creating unit for determining a first conversion matrix ($M_{LCD}$) for color conversion between a color space of a display device and a reference color space;
a first calculating unit for, based on the first conversion matrix ($M_{LCD}$), calculating first color values on the reference color space which correspond to predetermined colors on the color space of the display device;
a second conversion matrix creating unit for determining a second conversion matrix ($M_{tgt}$) for color conversion between a prescribed target color space and the reference color space;
a second calculating unit for, based on the second conversion matrix ($M_{tgt}$), calculating second color values on the prescribed target color space which correspond to the predetermined colors;
an arithmetic unit for, based on the first color values and the second color values, determining third color values on a new target color space which correspond to the predetermined colors;
a third conversion matrix creating unit for, based on the third color values, determining a third conversion matrix ($M_{new}$) for color conversion between the new target color space and the reference color space; and
a color conversion matrix creating unit for, based on the first conversion matrix ($M_{LCD}$) and the third conversion matrix ($M_{new}$), determining a color conversion matrix (M) for color conversion between the color space of the display device and the new target color space;
wherein
the predetermined colors on the color space of the display device are RGB colors;
the reference color space is the XYZ color space;
the first, second and third values are color values in the LCh colorimetric system; and
the arithmetic unit is configured to determine the third values by using the following equations:

$Rnewc = R0x*a + R1x*(1-a)$ $Rnewh = R0h*a + R1h*(1-a)$ $Gnewh = G0c*a + G1c*(1-a)$ $Gnewh = G0h*a + G1h*(1-a)$ $Bnewc = B0c*a + B1c*(1-a)$ $Bnewh = B0h*a + B1h*(1-a)$ where
Rnewc, Rnewh are the third color values for color R,
Gnewc, Gnewh are the third color values for color G,
Bnewc, Bnewh are the third color values for color B,
R0c, R0h are the second color values for color R,
G0c, G0h are the second color values for color G,
B0c, B0h are the second color values for color B,
R1c, R1h are the first color values for color R,
G1c, G1h are the first color values for color G,
B1c, B1h are the first color values for color B, and
a is a matching coefficient.

14. The color conversion matrix creating device according to claim 13, wherein the first, second and third color values in the LCh colorimetric system include only C and h values, such that color matching can be performed while properly controlling hue (C) and color saturation (h).

15. The color conversion matrix creating device according to claim 13, wherein the arithmetic unit is configured further to convert the third values in the LCh colorimetric system to xy chromaticity values for use by the third conversion matrix creating unit to determine the third conversion matrix ($M_{new}$).

* * * * *